United States Patent [19]
Ito et al.

[11] Patent Number: 5,644,488
[45] Date of Patent: Jul. 1, 1997

[54] DRIVING FORCE CONTROL APPARATUS AND METHOD FOR 4-WHEEL DRIVING VEHICLE

[75] Inventors: Yoshihito Ito, Okazaki, Japan; Hiroki Tuge, Frankfurt am Main, Germany

[73] Assignee: Mitsubishi Jidosha Kogyo Kabushiki Kaisha, Tokyo, Japan

[21] Appl. No.: 417,040

[22] Filed: Apr. 5, 1995

[30] Foreign Application Priority Data

Apr. 8, 1994 [JP] Japan ..................... 6-070359

[51] Int. Cl.$^6$ ............................. B60K 28/16
[52] U.S. Cl. ..................... 364/423.098; 180/197
[58] Field of Search ..................... 364/424.05, 426.02, 364/426.03, 426.04, 431.05; 180/197; 303/139, 113.2, 141, 145

[56] References Cited

U.S. PATENT DOCUMENTS

| | | | |
|---|---|---|---|
| 4,873,639 | 10/1989 | Sato et al. ............... | 364/426.02 |
| 4,921,064 | 5/1990 | Wazaki et al. ............ | 180/197 |
| 5,005,132 | 4/1991 | Yoshino ................... | 364/426.02 |
| 5,168,952 | 12/1992 | Oono et al. .............. | 180/197 |
| 5,225,982 | 7/1993 | Ito et al. ................ | 364/426.03 |
| 5,270,930 | 12/1993 | Ito et al. ................ | 364/424.01 |
| 5,283,742 | 2/1994 | Wazaki et al. ............ | 364/426.02 |
| 5,482,133 | 1/1996 | Iwata et al. .............. | 180/197 |

FOREIGN PATENT DOCUMENTS

| | | |
|---|---|---|
| 4031890 | 5/1991 | Germany. |
| 2140439 | 5/1990 | Japan. |

*Primary Examiner*—Kevin J. Teska
*Assistant Examiner*—Tan Nguyen

[57] ABSTRACT

In a driving force control apparatus for a 4-wheel driving vehicle, a target driving torque is obtained based on a value determined by subtracting a feedback correction torque corresponding to a slip amount from a reference torque corresponding to a vehicle body speed. Slip is suppressed by a throttle control so that the engine output is reduced to the target driving torque. A retard command is output when the slip amount DVS and a slip rate GDVS are greater than predetermined values to control retarding of an ignition timing of the engine, thereby suppressing an abrupt slip. Further, the two greatest values of slip amounts of each of four wheels $DVS_1$, $DVS_2$, $DVS_3$, and $DVS_4$ are differentiated to determine slip rates $GDVS_1$ and $GDVS_2$, and the smaller of the slip rates $GDVS_1$ and $GDVS_2$ is used for control of ignition timing retarding. The apparatus causes a 4-wheel driving vehicle equipped with a limited slip differential (LSD) to provide a sufficient effect of the LSD and further suppresses the occurrence of an excessive slip.

27 Claims, 6 Drawing Sheets

DRIVING FORCE CONTROL APPARATUS AND METHOD FOR 4-WHEEL DRIVING VEHICLE

FIELD OF THE INVENTION

This invention relates to a driving force control apparatus and method for a 4-wheel driving vehicle, which suppresses an excessive slip of the 4-wheel driving vehicle equipped with a limited slip differential (LSD) and which effectively achieves the function of the LSD.

BACKGROUND OF THE INVENTION

An excessive driving force when the vehicle is traveling on a slippery road such as a snow-laden road tends to cause a slippage of the driving wheels. This results in a reduction of gripping force of the tires, acceleration characteristics and drivability. To deal with such a situation, a driving force control apparatus or a so-called traction control apparatus has been developed and has been practically used.

In the traction control apparatus, a slip of the driving wheels is initially detected. When the slip is determined to be considerable, the output of the engine is forcibly and rapidly suppressed to reduce the driving force of the driving wheels independent of the depression amount of the acceleration pedal by the driver. This suppresses slippage of driving wheels to improve the starting and acceleration characteristics of the vehicle on a slippery road such as a snow-laden road.

A control device for reducing the engine output to suppress a slip includes the following:

(1) Throttle control (throttle valve of the intake system is closed)

(2) Ignition timing retard control (ignition timing of the ignition plug is retarded)

(3) Fuel control (fuel cutting or fuel injection amount control)

(4) Cylinder number control (operation of a predetermined number, among a plurality of cylinders, is suspended).

(5) Brake control (brake is operated to suppress the slip).

Most of the known traction control apparatuses use a combination of the throttle control and the ignition timing retard control. According to the throttle control, the engine output can be controlled smoothly and over a wide range. In an abrupt start or when the road surface condition suddenly changes from a dry road to a frozen road, a sharp slip occurs. The throttle control is not able to control such a sharp slip. When a sharp and excessive slip occurs, the ignition timing retard control is temporarily operated to suppress a sharp slip with a good response.

Initially, the traction control apparatus was applied to a 2-wheel driving (2-WD) vehicle. However, even a 4-wheel driving (4-WD) vehicle, with increased engine output and relegated to use with spiked tires, may undergo a slip on a slippery road. Accordingly, development has been conducted to apply the traction control apparatus to the 4-wheel driving vehicle.

The development has been directed to the following vehicle and apparatus:

(a) a 4-wheel driving vehicle provided with a limited slip differential (LSD) at the rear wheels (brief construction thereof will be described later);

(b) the traction control apparatus (driving force control apparatus) to be equipped as a mechanism using a combination of the throttle control and the ignition timing retard control (brief operation thereof will be described later).

Here, the 4-WD vehicle (a) provided with a rear wheel LSD will be briefly described. In the LSD, the differential gear itself is of a conventional bevel gear type. The LSD includes a viscous coupling mounted between the left differential side gear and the differential case. The right and left drive shafts are connected by the viscous coupling.

No differential effect appears when the rotational speeds of the right and left drive shafts are same, and the torque is equally distributed. When the vehicle runs on a split road (frictional coefficients of the road surface contacting the driving wheels differ between the right and left sides) or the like so that only one wheel makes a slip and its rotational speed is increased, the torque allocation to the opposite wheel is increased. That is, the differential action is limited when one wheel slips. Such a slip can occur on a rough road such as a split road or a snow-laden road or during the pulling out of a mire, for example.

Figure 5:
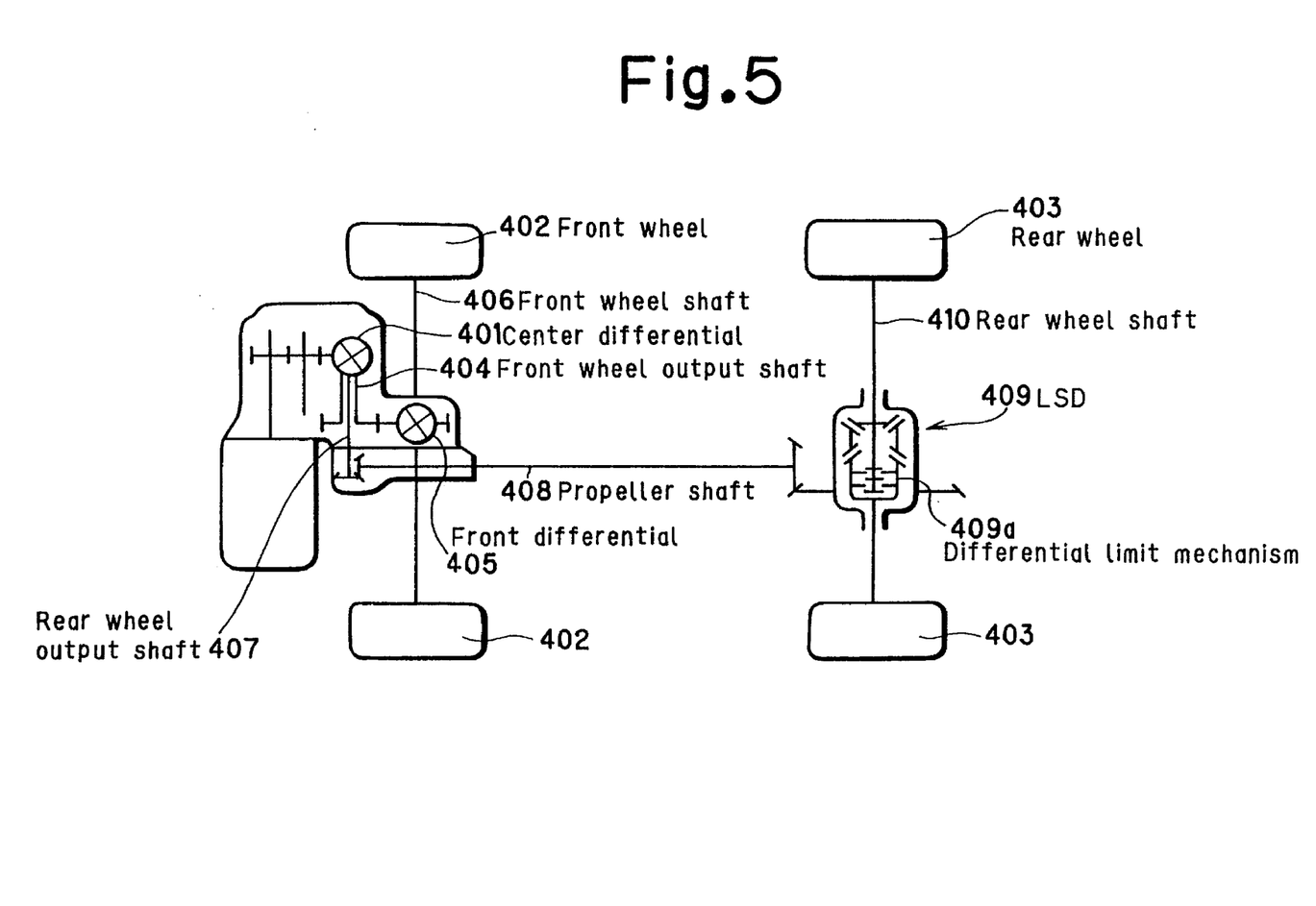
FIG. 5 is a schematic view showing the structure of a power transmission system of a 4-wheel driving vehicle provided with a rear wheel LSD.

FIG. 5 shows the power transmission system of a 4-wheel driving vehicle provided with a rear wheel LSD. As shown in FIG. 5, the torque output from the engine is transmitted to a center differential 401 through a torque converter and a transmission. The center differential 401 has a function to distribute the torque to front wheels 402 and rear wheels 403 in a predetermined ratio. The torque is then transmitted from the center differential 401 to the front wheels 402 through a front wheel output shaft 404, a front differential 405, and a front wheel shaft 406. Further, the torque is transmitted from the center differential 401 to the rear wheels 403 through a rear wheel output shaft 407, a propeller shaft 408, an LSD 409, and a rear wheel shaft 410. The LSD 409 incorporates a differential limit mechanism 409a.

Next, operation of the traction control apparatus (b) will be briefly described. In the traction control apparatus for use on a 4-wheel driving vehicle, a detailed construction of which will also be described in the embodiments of the present invention, when a slip occurs the throttle valve is forcibly closed. Further, when an abrupt slip occurs, a retard command L is output from the computer to effect ignition timing retard control temporarily.

Figure 6:
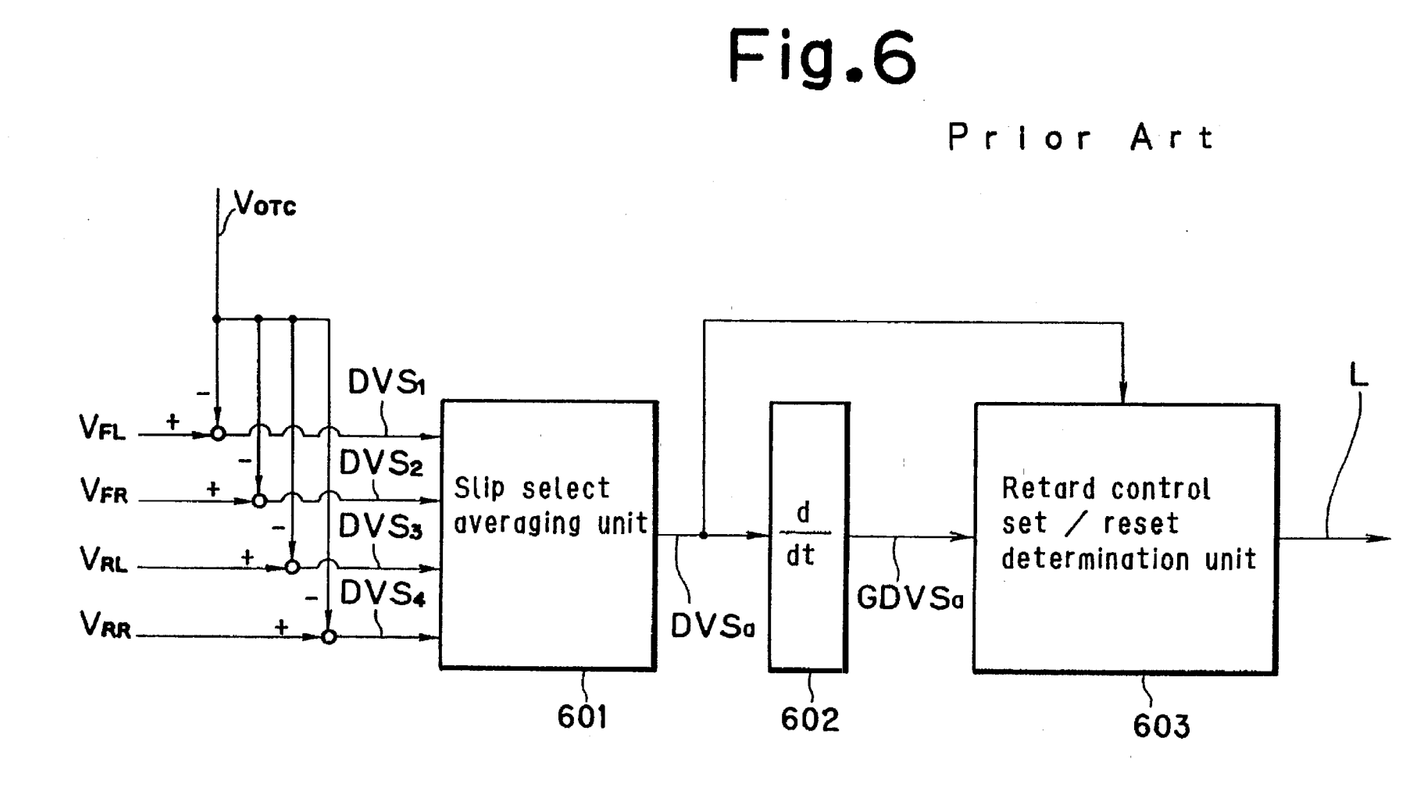
FIG. 6 is a block diagram showing the known control techniques.

In the known ignition timing retard control, as shown in FIG. 6, a correction target driving wheels speed $V_{OTC}$ (according to the vehicle body speed, which will also be described in the embodiments of the present invention) is subtracted from a left front wheel speed $V_{FL}$, right front wheel speed $V_{FR}$, left rear wheel speed $V_{RL}$, and right rear wheel speed $V_{RR}$ to determine slip amounts $DVS_1$, $DVS_2$, $DVS_3$, and $DVS_4$.

A slip select averaging unit 601 selects the greatest and the next greatest of the slip amounts $DVS_1$, $DVS_2$, $DVS_3$, and $DVS_4$, averages the two selected values, and outputs the averaged slip amount as an average slip amount $DVS_a$. A differentiation unit 602 differentiates the average slip amount $DVS_a$ to determine a slip rate $GDVS_a$. A retard control set/reset determination unit 603 outputs a retard command L when the average slip amount $DVS_a$ is greater than a predetermined value and the slip rate $GDVS_a$ is greater than a predetermined value. The ignition timing retard control is carried out by the output of the retard command L to decrease the driving force of the driving wheels, thereby suppressing an abrupt slip.

In the known system as shown in FIG. 6, the two largest values of the slip amounts are averaged to determine the slip amount $DVS_a$, which is differentiated to determine the slip rate $GDVS_a$. Therefore, when an abrupt slip occurs at only one of the four wheels, the slip rate $GDVS_a$ is also increased, and the retard control is executed.

In the 4-wheel driving vehicle having the rear LSD, when an abrupt slip occurs at only a single wheel, the vehicle body can create a stable running condition by the function of the rear LSD. Thus, it is better not to decrease the driving force of the driving wheels. However, when the known traction control apparatus is used, the driving force is decreased even though an abrupt slip occurs at only one wheel. Thus, the function of the LSD has not been effectively obtained. That is, with the LSD, even under a condition where the driving force need not be decreased, when the vehicle runs on a split road or the like, the retard control is frequently made to decrease the driving force. This deteriorates the drive feeling.

Particularly in the retard control, since the torque is immediately decreased by the retard, a shock due to torque variation tends to occur. Thus, if the retard control occurs excessively, drive feeling is deteriorated.

Further, when similar control is made by braking the wheels or by cutting fuel to decrease the fuel supply amount, a shock tends to occur due to an abrupt change of torque, resulting in a similar problem.

The technology having the above-described problems is also disclosed in Japanese Laid-open Patent Publication 2-140439.

In the technology described in Japanese Laid-open Patent Publication 2-140439, in a 4WD vehicle, a greatest wheel speed and a least wheel speed are selected from the individual wheel speeds. Then, a difference in speed between the greatest and least values, or a speed ratio of the greatest and least wheel speeds, is determined. Occurrence of a slip is determined when the speed difference or speed ratio is greater than a preset value to control the opening of the throttle valve. By making such a determination, a problem of excessive reduction in the driving force occurs since output control of the engine is effected when only one of the four wheels slips. In particular, when the determination method is applied to a vehicle in which engine output control is carried out by a high-response method such as ignition timing control or fuel cutting, or the driving force is controlled by braking control, not only the acceleration is reduced, but also driving comfort is impaired due to vibrations caused by repetitions of control.

SUMMARY OF THE INVENTION

With a view to eliminate such prior art problems, a primary object of the present invention is to provide a driving force control apparatus for a 4-wheel driving vehicle, which can be applied to a 4-wheel driving vehicle provided with an LSD and which can effectively provide the function of the LSD and suppress a slip.

In accordance with the present invention, which attains the above object, there is provided a driving force control apparatus and method for a 4-wheel driving vehicle having a differential system having a differential limiting mechanism disposed between front or rear right and left wheels of the vehicle for restricting a slip of the wheels by controlling a driving force transmitted from the wheels to a road surface, comprising:

wheel speed detection means for detecting individual rotational speeds of the four wheels;

slip detection means for detecting two selectively largest slip condition amounts, each slip condition amount indicating a magnitude of slip of an individual wheel according to a corresponding detected rotational speed of one of the four wheels;

slip change rate calculation means for determining change rates of the two slip condition amounts detected by the slip detection means;

slip change rate select means for selecting the relatively smaller of the two slip change rates determined by the slip change rate calculation means; and driving force control means for controlling the driving force according to the slip change rate selected by the slip change rate select means.

There is also provided according to the present invention, in a vehicle including a differential system with a differential limit mechanism, disposed between front or rear left and right wheels of the vehicle, for restricting slippage of the wheels by controlling a drive force transmitted from the wheels to a road surface, a driving force control method comprising the steps of:

(a) detecting speeds of the wheels of the vehicle;

(b) detecting two relatively largest slip condition amounts, each slip condition amount indicating a magnitude of slippage of a wheel according to a corresponding detected wheel speed;

(c) determining change rates of each of the detected two relatively largest slip condition amounts;

(d) selecting the relatively smaller one of the two determined change rates; and (e) controlling the driving force according to the selected change rate.

There is further provided according to the present invention a driving force control apparatus for controlling a driving force transmitted from the wheels of a vehicle to a road surface, comprising:

first means for detecting that a first condition is satisfied by detecting that a value derived from two relatively largest slip condition amounts is at least equal to a first predetermined value, each slip condition amount indicating a magnitude of slippage of one of the wheels according to a corresponding wheel speed; and second means for detecting that a second condition is satisfied by detecting that a relatively smaller of two change rates determined from each of the two relatively largest slip condition amounts is greater than a second predetermined value; and start means for initiating driving force control upon the first and second means detecting that the first and second respective conditions are satisfied.

In the present invention, the smaller of the two largest slip change rates is selected and, when the smaller slip rate is greater than a predetermined value, the retard control is effected. Therefore, the retard control does not take place when an abrupt slip occurs at only one wheel, thereby effecting the function of the LSD.

As described above in detail with reference to the embodiments, the present invention provides the following effects.

In one aspect of the present invention, since two wheels which are slipping are determined from the two greatest slips, and the driving force is controlled according to one of the slips which is not in an increasing tendency, when the vehicle is running on a split road, a reduction rate of the driving force is suppressed as compared to the conventional apparatus. This thereby eliminates insufficient acceleration due to an excessive reduction of the driving force as seen in the conventional apparatus.

Further, since the driving force is controlled according to the change rate of slip, a slip increasing tendency can be determined to achieve control of good response.

In the conventional apparatus, when the vehicle ran on a split road, the wheel provided with a differential limit mechanism hardly underwent slipping because if one wheel slipped, the driving force was transmitted from the other wheel to the road surface by the function of the differential limit mechanism. Therefore, when the driving force was reduced in the wheel having no differential limit mechanism, the driving force was excessively reduced, resulting in insufficient acceleration.

Another aspect of the present invention provides the same effect as previously described, wherein the slip calculation is made in two steps since the wheel rotational speed is first selected and then the slip is calculated.

In still another aspect, using the slip change rate selected by the slip change rate select device, start and end of the driving force control is made when the slip change rate satisfies a predetermined condition, thereby preventing unnecessary repetition of start and end of the driving control and thereby achieving exact control.

In a still further aspect, since the driving force can be controlled commonly in the individual wheels by controlling the engine output, the effect of the present invention is easily achieved.

In a further aspect, the engine torque can be rapidly varied by changing the ignition timing, thereby providing good control response.

In a still further aspect, the engine torque can be rapidly controlled by changing the ignition timing. Further, using the slip change rate selected by the slip change rate select device, start or end of the ignition timing retard control is made when the slip change rate satisfies a predetermined condition, thereby preventing unnecessary repetition of start and end of the driving force control and achieving improved driving comfort.

In an even further aspect of the present invention, by combining another engine control in addition to the high-response ignition timing control, the following effect can be obtained in addition to the prevention of unnecessary repetition of start and end of the ignition timing control. That is, the ignition timing control is considered to be the best in response among engine output control methods. Therefore, by combining another engine control which is hard to generate vibrations due to repeated start and end of control compared to the ignition timing control, and executing the another engine control according to the wheel rotational speed, slip can be positively prevented even when only one wheel makes a slip.

Another aspect of the present invention combines the intake air amount control with the ignition timing control to provide both driving force control of a good response achieved by changing the ignition timing, and driving force control of smooth torque variation and good drive feeling achieved by using the intake air amount control.

In yet an even further aspect, the present invention can rapidly and easily change the torque by controlling the braking force.

These and other objects of the invention will become more readily apparent from the understanding of the preferred embodiments described below with reference to the following drawing figures. It should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF PREFERRED EMBODIMENTS

The present invention will now be described in detail with reference to the drawings. This embodiment is directed to a driving force control apparatus to be equipped on a 4-wheel driving vehicle having a rear LSD. The driving force control apparatus (traction control apparatus) has a mechanism using a combination of throttle control and ignition timing retard control.

Figure 1:
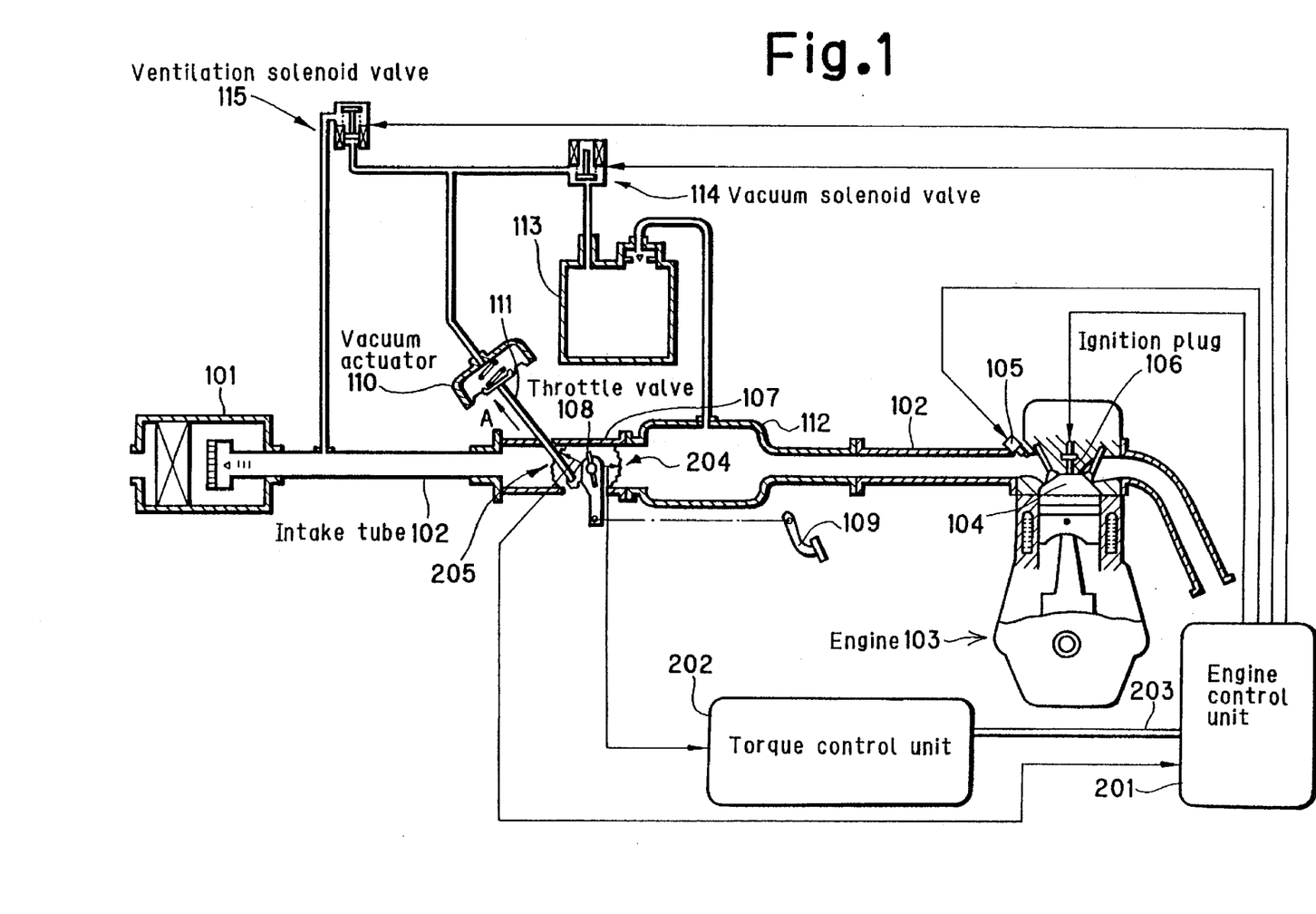
FIG. 1 is a schematic view showing the construction of an intake system, an engine system, and a control system of a vehicle to which the driving force control apparatus according to an embodiment of the present invention is applied.

The intake system, engine system, and control system of an embodiment in which the present invention is applied to a front-wheel driving type vehicle will first be described with reference to FIG. 1. Referring to FIG. 1, air is fed to a combustion chamber 104 of an engine 103 through an air cleaner 101 and an intake tube 102. The combustion chamber 104 is also fed with fuel injected from an injection valve 105, and the mixture in the combustion chamber 104 is combusted by ignition of an ignition plug 106.

A throttle body 107 is disposed halfway in the intake tube 102, and a throttle valve 108 for adjusting the amount of the intake air is rotatably disposed in the throttle body 107. When an acceleration pedal 109 is pressed down, the throttle valve 108 is rotated in an open direction and, when the foot is separated from the acceleration pedal 109, the throttle is returned to a full close condition by force of a spring. On the other hand, when a control rod 111 is pulled in the direction of the arrow A by a vacuum actuator 110, the throttle valve 108 is forcibly closed according to the pulling amount of the control rod 111. Operation of the vacuum actuator 110 will be described later.

A surge tank 112 communicates at the downstream of the throttle body 107, and the surge tank 112 communicates with a vacuum tank 113. On the other hand, a vacuum solenoid valve 114 is disposed between the vacuum tank 113 and the vacuum actuator 110, and a ventilation solenoid valve 115 is disposed between a section of the intake tube 102 (part of nearly the atmospheric pressure) close to the air cleaner 101 and the vacuum actuator 110.

The vacuum solenoid valve 114 is closed when unenergized and opened when energized. On the contrary, the ventilation solenoid valve 115 is opened when unenergized and closed when energized. On the other hand, the vacuum actuator 110 pulls the control rod 111 to the direction A when the inner pressure is negative, and when the inner pressure is at the atmospheric pressure, the control rod 111 is returned to a predetermined position by a spring incorporated in the vacuum actuator 110. Thus, the energizing condition of the solenoid valves 114 and 115 and the operation of the vacuum actuator 110 are summarized as follows.

(1) The solenoid valves 114 and 115 are both unenergized. The inner pressure of the vacuum actuator 110 is at the atmospheric pressure. The control rod 111 is at a position defined by the incorporated spring.

(2) The solenoid valves 114 and 115 are both energized. The inner pressure of the vacuum actuator 110 is at a negative pressure. The control rod 111 is pulled in the direction A.

The pulling position in the direction A of the control rod 111 is controlled by duty controlling the current in the solenoid valves 114 and 115 to determine the movement in the direction A of the control rod ill according to the duty ratio.

Here, open/close operation of the throttle valve 108 is summarized.

(1) When the duty ratio of the current to the solenoid valves 114 and 115 is 0%, and the control rod 111 of the vacuum actuator 110 is at a position defined by the spring, the throttle valve 108 is opened in one to one correspondence to the depression amount of the acceleration pedal 109.

(2) When the solenoid valves 114 and 115 are energized to pull the control rod 111 in the direction A, the throttle valve 108 is forcibly closed independent of the depression amount of the acceleration pedal 109. The closing amount of the throttle valve 108 is in response to the current duty ratio to the solenoid valves 114 and 115.

An engine control unit 201 can forcibly close the throttle valve 108 by controlling the current supplied to the solenoid valves 114 and 115. This reduces the output of the engine 103.

Further, the engine control unit 201 can also adjust the ignition timing of the ignition plug 106, and the output of the engine 103 can be reduced by retarding the ignition angle.

Further, the engine control unit 201 also adjusts the amount of fuel injected from the injection valve 105.

A torque control unit 202 is connected to the engine control unit 201 by a communication cable 203. The engine control unit 202 sends an engine condition signal to the torque control unit 202, and the torque control unit 202 sends information on the target driving torque (the calculation method will be described later) and sends retarding ratio of the ignition timing to the engine control unit 201.

The torque control unit 202 receives signals from an accelerator opening sensor 204 and various sensors (details will be described later) to make a determination of a slip, a determination of a split road, calculation of the target driving torque, and calculation of the retarding ratio as will be described later. On the other hand, the engine control unit 201 receives information from sensors such as a throttle opening sensor 205 and the torque control unit 202 to control output of the engine 103. Particularly for forcible reduction of the engine output, the engine control unit 201 increases the duty ratio of the solenoid valves 114 and 115 and retards the ignition timing of the ignition plug 106.

Next, the construction and calculation procedures in the torque control unit 202 and the peripheral sensors will be described with reference to FIG. 2.

Figure 2:
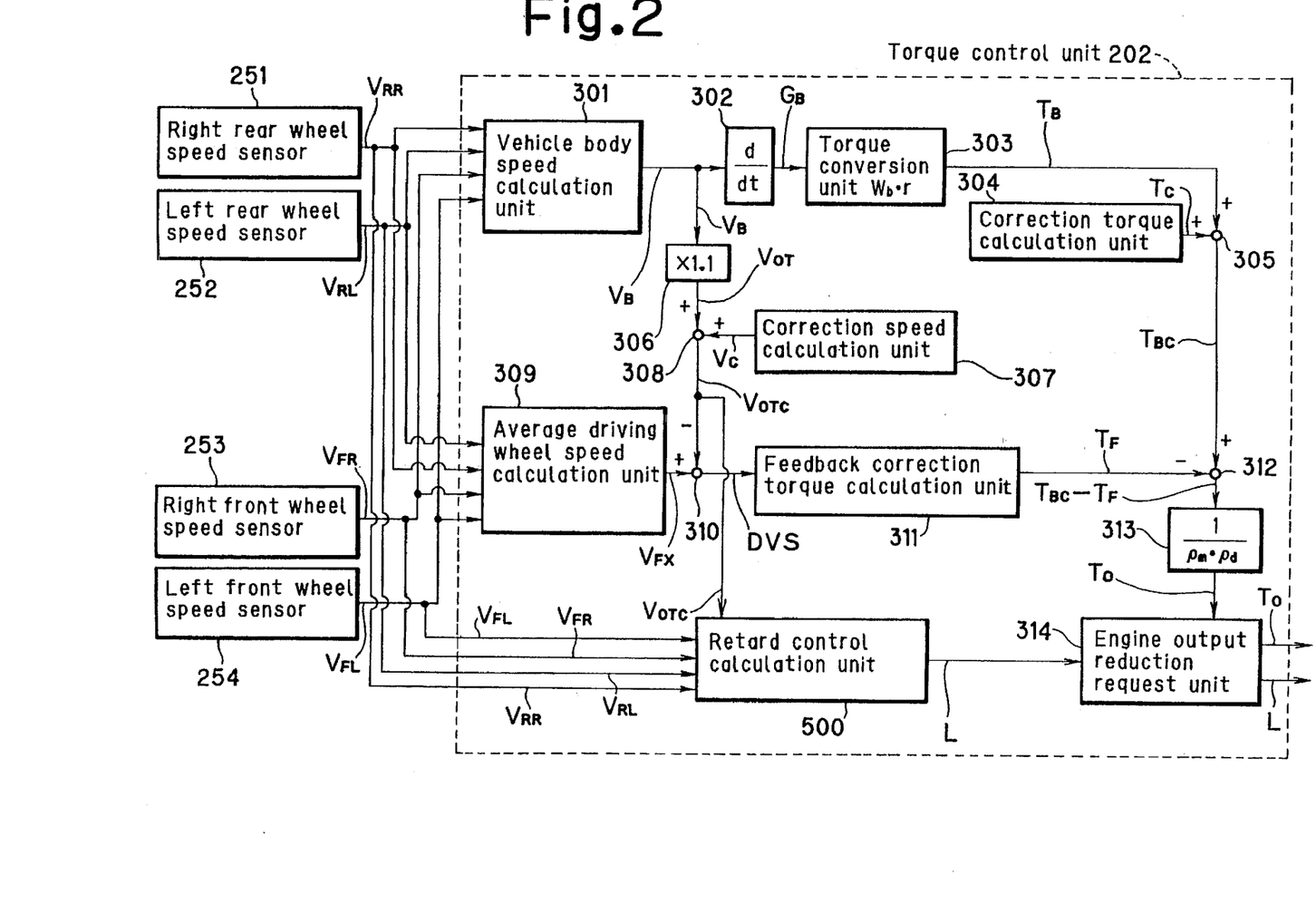
FIG. 2 is a block diagram showing a torque control unit used in the present embodiment.

As shown in FIG. 2, the torque control unit 202 is connected with a right rear wheel speed sensor 251, a left rear wheel speed sensor 252, a right front wheel speed sensor 253, a left front wheel speed sensor 254, and various other sensors (not shown). The right rear wheel speed sensor 251 detects a right rear wheel speed $V_{RR}$; the left rear wheel speed sensor 252 detects a left rear wheel speed $V_{RL}$; the right front wheel speed sensor 253 detects a right front wheel speed $V_{FR}$; and the left front wheel speed sensor 254 detects a left front wheel speed $V_{FL}$.

A vehicle body speed calculation unit 301 of the torque control unit 202 selects the third greatest of the wheel speeds $V_{RR}$, $V_{RL}$, $V_{FR}$, and $V_{FL}$, and outputs it as a vehicle body speed $V_B$. A differentiation unit 302 differentiates the vehicle body speed $V_B$ to determine a longitudinal acceleration $G_B$ along the straight running direction of the vehicle. A torque conversion unit 303 multiplies the longitudinal acceleration $G_B$ by a vehicle body weight $W_b$ and an effective tire radius r of the front wheels to determine a reference driving torque $T_B$. A correction torque calculation unit 304 determines a correction torque $T_C$, and an addition unit 305 adds the correction torque $T_C$ to the reference driving torque $T_B$ to determine a correction reference driving torque $T_{BC}$. The correction torque $T_C$ is a sum of a running resistance and a cornering drag torque. The running resistance is determined from prestored mapped data. The running resistance tends to increase as the vehicle body speed increases, and tends to increase as the turning angle of the steering shaft increases.

On the other hand, a multiplication unit 306 multiplies the vehicle body speed $V_B$ by a constant (1.1) to determine the target driving wheel speed $V_{OT}$. The value 1.1 of the constant has been determined based on the following findings. That is, the value has been determined in consideration of the fact that drivability and acceleration characteristics are improved when, during traveling of a vehicle, the front wheels (driving wheels) make a slip of about 10% relative to the road surface.

A correction speed calculation unit 307 determines a correction speed $V_C$. The correction speed $V_C$ is determined by subtracting a turning correction value from an acceleration correction value. The acceleration correction value is determined from prestored mapped data. The acceleration correction value tends to increase in steps as the value of the longitudinal acceleration $G_B$ increases. The turning correction acceleration is also determined from prestored mapped data. The turning correction acceleration tends to increase as the value of a lateral acceleration (corresponding to the speed difference between the right and left rear wheels) increases.

An addition unit 308 adds the correction speed $V_C$ to the target driving wheel speed $V_{OT}$ to determine a correction target driving wheel speed $V_{OTC}$.

An average driving wheel speed calculation unit 309 selects the greatest and the next greatest of the wheel speeds $V_{RR}$, $V_{RL}$, $V_{FR}$, and $V_{FL}$, and averages the selected two speeds to determine an average driving wheel speed $V_{FX}$. A subtraction unit 310 subtracts the correction target driving speed $V_{OTC}$ from the average driving wheel speed $V_{FX}$ to determine a slip amount DVS.

A feedback correction torque calculation unit 311 makes a proportional calculation by multiplying the slip amount by a proportional coefficient to determine a basic proportional correction torque which is proportional to the slip amount; an integral calculation by integrating the slip amount to determine an integral correction torque which corresponds to a gradual variation of the slip amount; and a differential calculation by differentiating the slip amount to determine a differentiation correction torque which corresponds to a rapid change in slip amount. Further, the proportional correction torque, the integral correction torque, and the differential correction torque are summed to determine a feedback correction torque $T_F$.

A subtraction unit 812 subtracts the feedback correction torque $T_F$ from the correction reference driving torque $T_{BC}$.

Further, a division calculation unit 313 divides the torque ($T_{BC}-T_F$) by a total reduction ratio $\rho m \cdot \rho d$ (for a manual transmission) to determine the target driving torque $T_O$. In the above equation, $\rho m$ is a transmission speed change ratio, and $\rho d$ is a differential gear reduction ratio. For an automatic transmission, the total reduction ratio is $\rho m \cdot \rho d \cdot \rho T$ in consideration of the torque converter ratio $\rho T$.

The target driving torque $T_O$ corresponds to a value obtained by subtracting the feedback correction torque $T_F$ (this corresponds to a torque necessary to induce a slip) from the reference driving torque $T_B$ (this corresponds to a torque necessary to maintain the vehicle body speed $V_B$). Therefore, slip is suppressed by reducing the engine output to the target driving torque $T_O$. The target driving torque $T_O$ is transmitted to an engine output reduction request unit 314.

A retard control calculation unit 500 receives the individual wheel speeds $V_{RR}$, $V_{RL}$, $V_{FR}$, $V_{FL}$, the correction target driving wheel speed $V_{OTC}$, detects occurrence of an abrupt slip from these data, and outputs the retard command L when an abrupt slip occurs. The construction and control procedure of the retard control calculation unit 50 is one of the key points of the present application, of which details will be described later with reference to FIG. 3 and FIG. 4.

The engine output reduction request unit 314, when (i) the traction control switch is turned on by the driver to select the traction control, and (ii) the conditions that the slip amount DVS and the slip rate are predetermined values or greater and the like are satisfied, transmits the target driving torque $T_O$ and the retard command L to the engine control unit 201.

The engine control unit 201 controls the current duty ratio in the solenoid valves 114 and 115 to forcibly close the throttle valve 108 so that the output of the engine 103 is the target driving torque $T_O$. Further, the engine control unit 201 retards the ignition timing of the ignition plug 106 in response to the retard command L.

Figure 3:
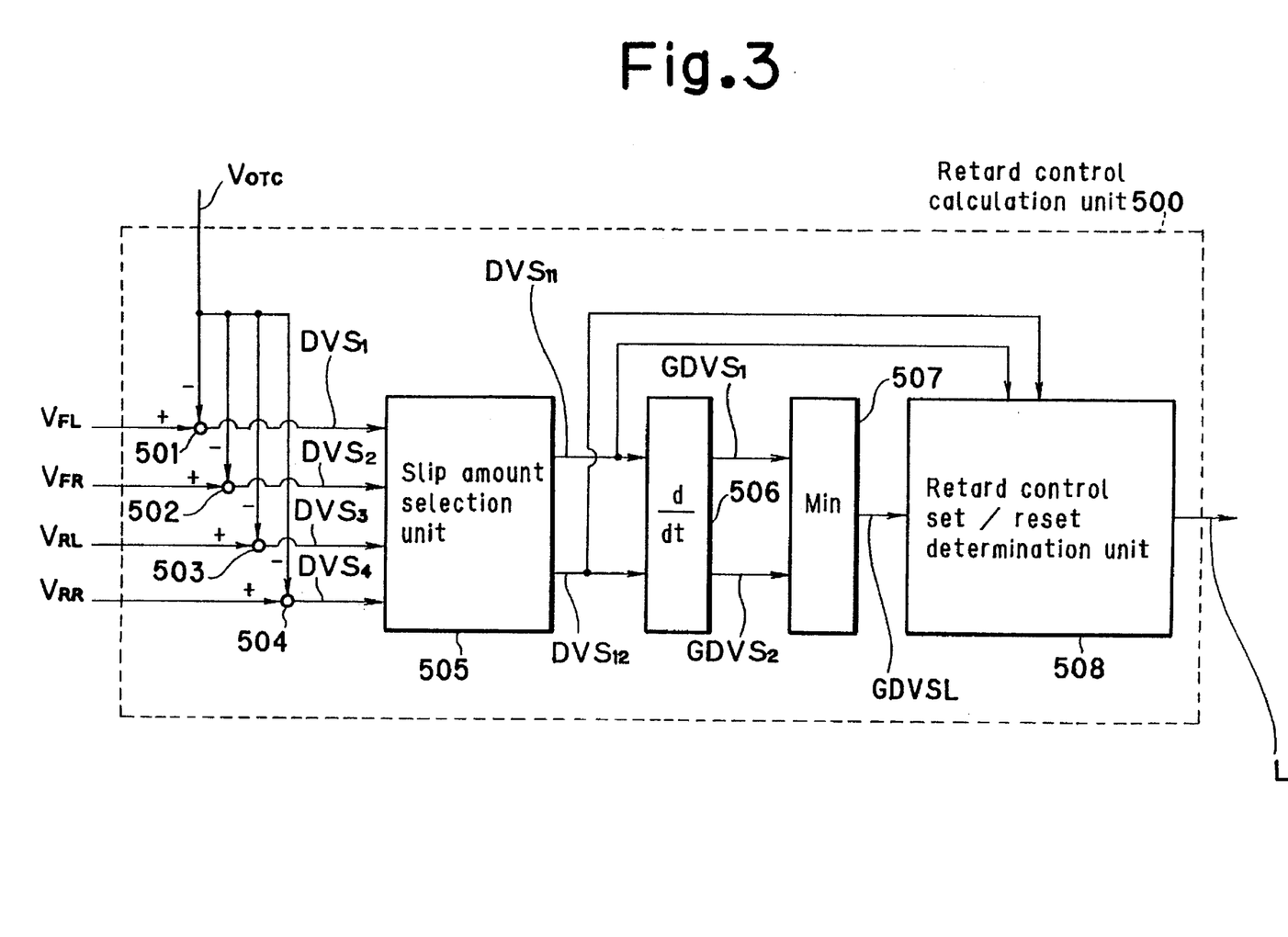
FIG. 3 is a block diagram showing a retard control/calculation unit used in the embodiment.

A first preferred embodiment of the retard control calculation unit 500 will be described with reference to FIG. 3. As shown in FIG. 3, individual subtraction units 501, 502, 503, and 504 individually subtract the correction target driving wheel speed $V_{OTC}$ from the individual wheel speeds $V_{FL}$, $V_{FR}$, $V_{RL}$, and $V_{RR}$ to output slip amounts $DVS_1$, $DVS_2$, $DVS_3$, and $DVS_4$. A slip amount select unit 505 selects the greatest and the next greatest of the slip amounts $DVS_1$, $DVS_2$, $DVS_3$, and $DVS_4$, and outputs these as slip amounts $DVS_{11}$ and $DVS_{12}$. A differentiation unit 506 differentiates the slip amounts $DVS_{11}$ and $DVS_{12}$, and outputs two slip rates $GDVS_1$ and $GDVS_2$. The slip rates $GDVS_1$ and $GDVS_2$ indicate the rates of change per unit of time of the slip amounts $DVS_{11}$ and $DVS_{12}$, and the values of the slip rates $GDVS_1$ and $GDVS_2$ increase when an abrupt and excessive slip occurs.

A least determination unit 507 selects the smaller of the slip rates $GDVS_1$ and $GDVS_2$, and outputs it as a least slip rate $GDVSL$.

A retard control set/reset determination unit 508 is set with a set (start) condition and a reset (end) condition of the ignition timing retard control being set, for example, as shown below, where an average of the slip amounts $DVS_{11}$ and $DVS_{12}$ is referred to as $DVS_O$, and the gravitational acceleration is referred to as G.

The ignition timing retard control is set to output the retard command L when the following conditions (1) and (2) are simultaneously met.

(1) Slip amount $DVS_O \geq 2$ [km/h]
(2) Slip rate $GDVS > 0.6$ G

That is, the ignition timing retard control is set when the slip amount $DVS_O$ and the slip rate $GDVSL$ are both greater than predetermined values.

The ignition timing retard control is reset to stop outputting the retard command L when the following (3-1) and (3-2), or (4-1) and (4-2), are simultaneously met.

(3-1) $-0.50$ G $\leq GDVSL \leq$) G
(3-2) $DVS_O < 6$ [km/h]
(4-1) $GDVSL < -0.5$ G
(4-2) $DVS_O < 18$ [km/h]

The above (3-1) and (3-2) are conditions occurring when the slip rate $GDVSL$ decreases to some extent and the slip amount $DVS_O$ considerably decreases. The above (4-1) and (4-2) are conditions occurring when the slip amount $DVS_O$ decreases to some extent and the slip rate $GDVSL$ considerably decreases.

The retard control calculation unit 500 is in a condition to output the retard command L, when the least slip rate $GDVSL$, which is the smaller of the slip rates $GDVS_1$ and $GDVS_2$, is greater than a predetermined value. Therefore, when a slip of one of the four wheels abruptly increases, one of the slip rates $GDVS_1$ and $GDVS_2$ becomes increased but the other is small. Accordingly, ultimately, the least slip rate $GDVSL$ is small and the condition (2) is not met, and the retard command L is not output.

In the 4-wheel driving vehicle having a rear LSD, since, even when an abrupt slip occurs in one of the wheels, the vehicle body can maintain a stable running condition by the function of the rear LSD. Therefore, it is better not to reduce the driving force of the driving wheels. In the present embodiment, even when an abrupt slip occurs in one of the wheels, the condition (2) is not met. Thus, the function of the rear LSD can be sufficiently effected without using the ignition timing retard control. This effect is the object of the present embodiment.

Of course, when the least slip rate $GDVSL$ is greater than the predetermined value, that is, when an abrupt slip occurs in two or more wheels and the condition (2) is met, and the condition (1) is met, the ignition timing retard control is executed to suppress the occurrence of a slip.

Figure 4:
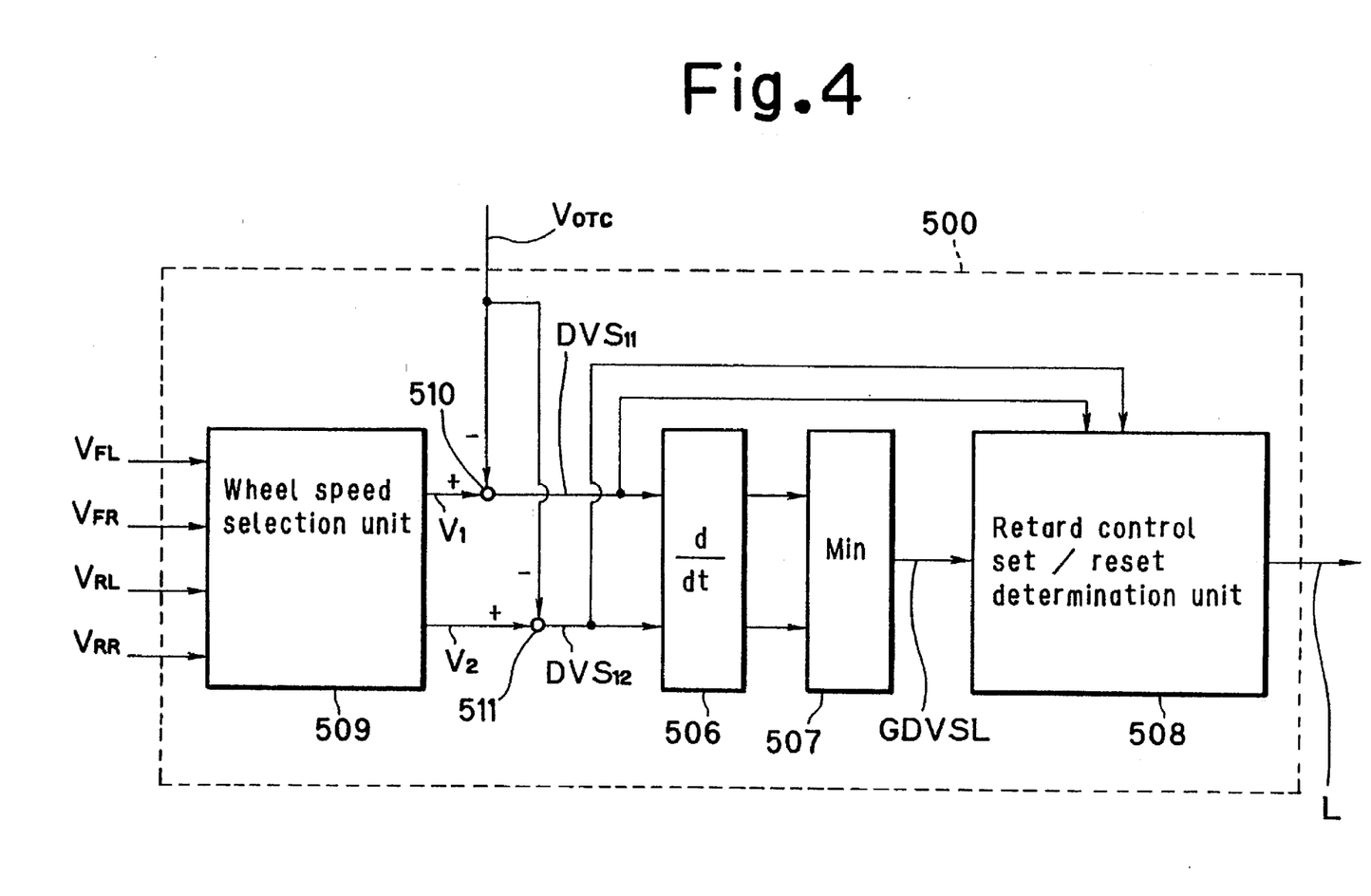
FIG. 4 is a block diagram showing a retard control/calculation unit used in the embodiment.

FIG. 4 shows a second preferred embodiment of the retard control calculation unit 500. In the second preferred embodiment, a wheel speed select unit 509 selects the greatest and the next greatest of the individual wheel speeds $V_{FL}$, $V_{FR}$, $V_{RL}$, and $V_{RR}$, and outputs these as wheel speeds $V_1$ and $V_2$. Subtraction units 510 and 511 subtract the correction target driving wheel speed $V_{OTC}$ from the wheel speeds $V_1$ and $V_2$ to output the slip amounts $DVS_{11}$ and $DVS_{12}$. The subsequent procedure is the same as shown in FIG. 3, and the same effect as the first preferred embodiment is achieved.

The above-described embodiment is a driving force control apparatus using a combination of (1) the throttle control and (2) the ignition timing retard control. However, alternatively, the present invention can also be applied to a driving force control apparatus using (3) fuel control or (4) cylinder number control instead of the ignition timing retard control, wherein control may be achieved as in the above embodiment for starting of the individual controls (3), (4), and (5).

Instead of the ignition timing retard control, the wheels may be braked by a braking apparatus. In this case, braking is started when the retard start condition in the embodiment is met, and braking is released when the retard end condition is met. The braking force during braking may be a constant value, or may be controlled according to the slip condition of the wheels in a manner similar to a conventional slip control apparatus using a brake system.

Further, instead of the ignition timing retard control, fuel supply amount to the engine may be changed, for example, cutting fuel supply to some or all of the cylinders.

In this case, cutting of the fuel supply is started when the retard start condition in the embodiment is met, and it is released when the retard end condition is met. Further, rather than fuel cutting, a decrease in fuel supply amount may have a similar control effect.

In the present embodiment, the slip amount which is a deviation between the actual driving wheel speed and the target driving wheel speed is used as the slip condition amount. However, alternatively, the slip rate calculated using both values may be used as a slip condition amount, and any value which represents the magnitude of slip may be used to obtain the same effect.

As described above in detail with reference to the embodiments, the present invention provides the following effects.

From the above described embodiments of the present invention, it is apparent that the present invention may be modified as would occur to one of ordinary skill in the art without departing from the spirit and scope of the present invention which should be defined solely by the appended claims. Changes and modifications to the above described preferred embodiments that are apparent to those of ordinary skill in the art should be included within the scope of the appended claims.

What is claimed is:

1. A driving force control apparatus for a 4-wheel drive vehicle including a differential system with a differential limit mechanism disposed between front or rear right and left wheels of the vehicle for restricting a slip of the wheels by controlling a driving force transmitted from the wheels to a road surface, comprising:

wheel speed detection means for detecting individual rotational speeds of each of the four wheels;

slip detection means for detecting two relatively largest slip condition amounts, each slip condition amount indicating a magnitude of slip of an individual wheel according to a corresponding wheel rotational speed of one of the four wheels detected by said wheel speed detection means;

slip change rate calculation means for determining change rates of the two relatively largest slip condition amounts detected by said slip detection means;

slip change rate selection means for selecting the relatively smaller slip change rate of two slip change rates determined by said slip change rate calculation means; and driving force control means for controlling the driving force according to the slip change rate selected by said slip change rate select means.

2. The driving force control apparatus of claim 1, wherein said slip detection means includes, slip calculation means for calculating the slip condition amounts of the four individual wheels according to a corresponding one of the four wheel rotational speeds detected by said wheel speed detection means; and slip selection means for selecting the two relatively largest slip condition amounts from the four slip condition amounts calculated by said slip calculation means.

3. The driving force control apparatus of claim 1, wherein said slip detection means includes, wheel speed selection means for selecting the two relatively largest rotational speeds of the four wheel rotational speeds detected by said wheel speed detection means; and slip calculation means for calculating the slip condition amounts for the wheels corresponding to the two relatively largest wheel rotational speeds selected by said wheel speed selection means.

4. The driving force control apparatus of claim 1, wherein said driving force control means begins driving force control when the slip change rate selected by said slip change range rate selection means satisfies a predetermined start determination condition, and ends driving force control when the selected slip change rate satisfies a predetermined end determination condition.

5. The driving force control apparatus of claim 1, wherein said driving force control means controls the driving force by varying an output of an engine of the vehicle.

6. The driving force control apparatus of claim 5, wherein said driving force control means controls the driving force by controlling an ignition timing of the engine.

7. The driving force control apparatus of claim 6, wherein said driving force control means begins a retarding of the ignition timing when the slip change rate selected by said slip change rate selection means satisfies a predetermined start determination condition, and ends a retarding of the ignition timing when the selected slip change rate satisfies a predetermined end condition.

8. The driving force control apparatus of claim 6, further comprising engine output control means for controlling output of the engine to control the driving force, separately from said driving force control means, according to the wheel rotational speed detected by said wheel speed detection means.

9. The driving force control apparatus of claim 8, wherein said engine output control means controls an amount of air intake of the engine.

10. The driving force control apparatus of claim 1, wherein said driving force control means controls the driving force by controlling a braking force of a brake system of the vehicle for braking the wheels.

11. In a vehicle including a differential system with a differential limit mechanism, disposed between front or rear left and right wheels of the vehicle, for restricting slippage of the wheels by controlling a drive force transmitted from the wheels to a road surface, a driving force control method comprising the steps of:

(a) detecting speeds of the wheels of the vehicle;

(b) detecting two relatively largest slip condition amounts, each slip condition amount indicating a magnitude of slippage of a wheel according to a corresponding detected wheel speed;

(c) determining change rates of each of the detected two relatively largest slip condition amounts;

(d) selecting the relatively smaller one of the two determined change rates; and (e) controlling the driving force according to the selected change rate.

12. The driving force control method of claim 11, wherein step (b) includes the substeps of:

(b1) calculating slip condition amounts for each of the four wheels according to a corresponding detected speed; and (b2) selecting the two relatively largest slip condition amounts calculated.

13. The driving force control method of claim 11, wherein step (b) includes the substeps of:

(b1) selecting the two relatively largest detected wheel speeds of the wheel speeds detected in step (a), and (b2) calculating slip condition amounts for each of the two relatively largest detected wheel speeds selected.

14. The driving force control method of claim 11, wherein step (e) includes controlling an output of the engine.

15. The driving force control method of claim 14, wherein step (e) includes retarding of the ignition timing.

16. The driving force control method of claim 15, wherein the ignition timing is retarded in step (e) upon:

(1) determining that an average value of the slip condition amounts detected in step (b) is at least equal to a first predetermined value; and (2) determining that the change rate selected in step (d) is greater than a second predetermined value.

17. The driving force control method of claim 15, wherein step (e) includes the substeps of:

(e1) beginning a retarding of the ignition timing upon the change rate selected in step (d) satisfying a predetermined start condition; and (e2) ending a retarding of the ignition timing upon the change rate selected in step (d) satisfying a predetermined end condition.

18. The driving force control method of claim 17, wherein step (e) includes the further substeps of:

(e3) beginning the retarding of the ignition timing only upon the change rate selected in step (d) satisfying a predetermined start condition and an average value of the slip condition amounts detected in step (b) satisfying an additional predetermined start condition; and (e4) ending the retarding of the ignition timing upon the change rate selected in step (d) satisfying a predetermined end condition and an average value of the slip condition amounts detected in step (b) satisfying an additional predetermined end condition.

19. The driving force control method of claim 17, wherein the predetermined start condition is satisfied upon the change rate selected in step (d) being greater than first predetermined value and the predetermined end condition is satisfied upon the change rate selected in step (d) being less than a second predetermined value, less than the first predetermined value.

20. The driving force control method of claim 18, wherein the predetermined start condition is satisfied upon the change rate selected in step (d) being greater than a first predetermined value and upon the average value of the slip condition amounts detected in step (b) being at least equal to a second predetermined value, and wherein the predetermined end condition is satisfied upon the change rate selected in step (d) being less than a third predetermined value which is less than the first predetermined value, and upon the average value of the slip condition amounts detected in step (b) being less than a fourth predetermined value which is greater than the second predetermined value.

21. A driving force control apparatus for controlling a driving force transmitted from the wheels of a vehicle to a road surface, comprising:

first means for detecting that a first condition is satisfied by detecting that a value derived from two relatively largest slip condition amounts is at least equal to a first predetermined value, each slip condition amount indicating a magnitude of slippage of one of the wheels according to a corresponding wheel speed; and second means for detecting that a second condition is satisfied by detecting that a relatively smaller of two change rates determined from each of the two relatively largest slip condition amounts is greater than a second predetermined value; and start means for initiating driving force control upon the first and second means detecting that the first and second respective conditions are satisfied.

22. The driving force control apparatus of claim 21, wherein the driving force is controlled by controlling an ignition timing of an engine of the vehicle and the start means initiates retarding of the ignition timing upon the first and second means detecting that the first and second respective conditions are satisfied.

23. The driving force control apparatus of claim 21, wherein the detected value derived from the two relatively largest slip condition amounts is an average value of the two relatively largest slip condition amounts.

24. The driving force control apparatus of claim 21, further comprising:

end means for terminating driving force control upon the first and second means detecting that a respective third and fourth condition are satisfied, the first means detecting that the third condition is satisfied by detecting that the value derived from the two relatively largest slip condition amounts is less than a third predetermined value which is greater than the first predetermined value, and the second means detecting that the fourth condition is satisfied by detecting that the relatively smaller change rate is less than a fourth predetermined value which is less than the second predetermined value.

25. The driving force control apparatus of claim 22, further comprising:

end means for terminating retarding of the ignition timing upon the first and second means detecting that a respective third and fourth condition are satisfied, the first means detecting that the third condition is satisfied by detecting that the value derived from the two relatively largest slip condition amounts is less than a third predetermined value which is greater than the first predetermined value, and the second means detecting that the fourth condition is satisfied by detecting that the relatively smaller change rate is less than a fourth predetermined value which is less than the second predetermined value.

26. The driving force control apparatus of claim 24, wherein the detected value derived from the two relatively largest slip condition amounts is an average value of the two relatively largest slip condition amounts.

27. The driving force control apparatus of claim 25, wherein the detected value derived from the two relatively largest slip condition amounts is an average value of the two relatively largest slip condition amounts.

* * * * *

UNITED STATES PATENT AND TRADEMARK OFFICE
CERTIFICATE OF CORRECTION

PATENT NO. : 5,644,488  
DATED : September 9, 1997  
INVENTOR(S) : David W. Smith Page 1 of 1

It is certified that error appears in the above-identified patent and that said Letters Patent is hereby corrected as shown below:

<u>Claims 2, 3, 4, 5, and 6,</u>
Line 1, replace "device" with -- machine --.

Signed and Sealed this

Twenty-fifth Day of December, 2001

Attest:

JAMES E. ROGAN
*Attesting Officer*  *Director of the United States Patent and Trademark Office*

UNITED STATES PATENT AND TRADEMARK OFFICE
CERTIFICATE OF CORRECTION

PATENT NO. : 5,644,488
DATED : July 1, 1997
INVENTOR(S) : Yoshihito Ito

It is certified that error appears in the above-identified patent and that said Letters Patent is hereby corrected as shown below:

This certificate supersedes certificate of correction issued December 25, 2001, the number was erroneously mentioned and should be deleted since no certificate of correction was granted.

Signed and Sealed this

Nineteenth Day of February, 2002

Attest:

JAMES E. ROGAN
Attesting Officer    Director of the United States Patent and Trademark Office